Sept. 9, 1947.  W. LUCKTON  2,427,148
RODENT TRAP
Filed July 13, 1945
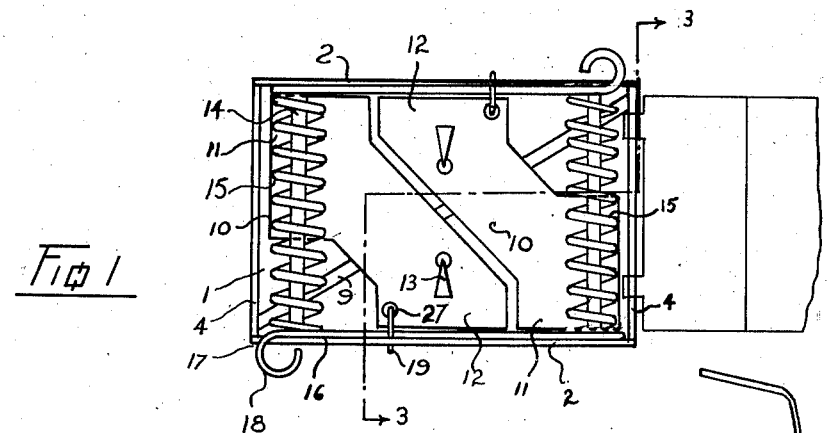
Fig 1
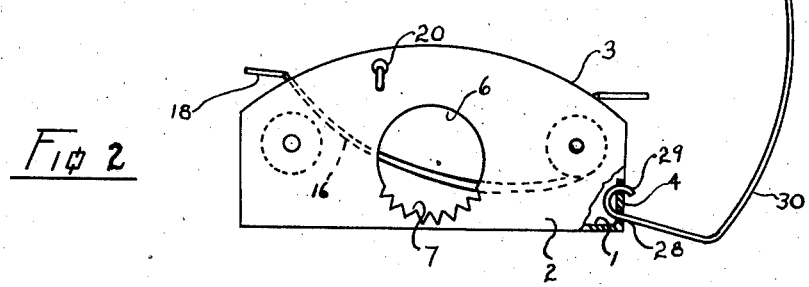
Fig 2
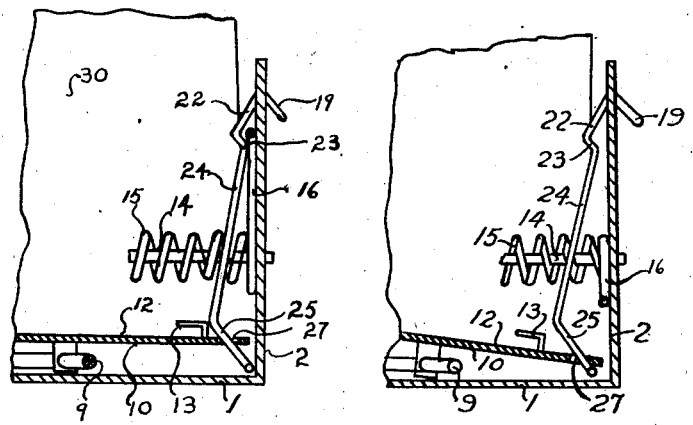
Fig 3  Fig 4
INVENTOR
WALTER LUCKTON
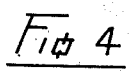
ATTORNEY Patented Sept. 9, 1947

2,427,148

UNITED STATES PATENT OFFICE 2,427,148

RODENT TRAP

Walter Luckton, Cloverdale, British Columbia, Canada

Application July 13, 1945, Serial No. 604,792

2 Claims. (Cl. 43—85)

My invention relates to improvements in rodent traps the objects of which are to provide a trap in which the tripping or springing means is very sensitive and the setting of the trap may be done with extreme ease and without danger to the user of being hurt due to improper setting. Further objects are to provide a trap in which two trap movements can be conveniently provided without recourse to doubling the normal area of a single trap, so that with a relatively small trap two rodents may be caught conveniently.

The embodiment of the invention herein described contemplates a base having opposed side walls each provided with an opening through which the rodent is capable of entering its head to reach the bait and a pair of trip plates mounted on a single support and a spring arm actuated by each trip plate adapted to sweep the opening.

Referring to the drawings—

Fig. 1 is a plan view of the trap with the cover open.

Fig. 2 is a side elevational view.

Fig. 3 is an enlarged sectional view taken on the line 3—3 of Figure 1, showing one side of the trap set.

Fig. 4 is a similar view showing said trap sprung.

In the drawings like characters of reference indicate corresponding parts in each figure.

The numeral 1 indicates generally a base having side walls 2 which are preferably rounded as at 3, see Figure 2, and shallow end walls 4. The side walls 2 are each provided with an opening 6 having a plurality of prongs 7 around its lower periphery, which are adapted to prevent an animal from removing its head after being caught therein.

Extending between the end walls 4 is a horizontal rod 9 upon which a pair of trip plates 10 are rockingly mounted, the axis of each of the trip plates is so placed that the portion of the plate indicated by the numeral 11, which is remote from the trigger portion 12, is the heavier, so that the trigger portion which is provided with an upstanding bait tongue 13, will hold the plate substantially level when the trap is set, as shown in Figure 3.

A pair of rods 14 extend between the side walls 2 upon each of which a spring 15, anchored at one end, is mounted, the opposite end of said spring is extended across the rear of the opening 6 to form a striker 16, as shown partly in dotted line in Figure 2 and in solid line in Figures 1, 3 and 4. The free end of the striker 16 is outwardly bent as at 17 to overlie the top of the wall on reaching the end of its downward stroke and is then preferably bent to form a ring 18.

A latch 19 is suspended from an orifice 20 in each side wall, which is a wire shaped to provide a suspension member 22 having an inclined seat 23 and an inwardly inclined shank 24 which terminates at its lower extremity in an outwardly inclined cam 25 which extends through an orifice 27 in the trigger portion 12 of a trip plate 10. One of the end walls 4 is apertured as at 28 to receive hinge lugs 29 of a cover 30, which cover is spaced from the side walls a sufficient distance to leave free swinging movement to the strikers 16 and to turn down to the base 1 adjacent the opposite end wall. The depending weight of each latch 19 would cause it to assume the position shown in Figure 3 if hanging free with its lower extremity in contact with the side wall 2, consequently when the striker is raised to set the trap it rests on the inclined seat 23 and tends to urge the lower extremity of the latch away from the wall, this movement, however, is restricted by the inner margin of the orifice 27 since the trip plate 10 is weighted to normally assume a substantially horizontal position. This restriction of inward movement prevents the seat 23 from receding from the wall 2 and retains the striker in raised position as shown in Figure 3. When an animal places its head and probably a foot through the opening 6 and puts a downward pressure upon the adjacent trigger portion 12, the resistance to inward movement of the latch is removed and the cam 25 causes an accelerated downward movement of the trigger portion and the swinging movement of the seat 23 from the wall 2 permits the striker 16 to sweep across the opening 6 and kill the entrapped animal. The final entrapping movement leaves the parts as shown in Figure 4.

As soon as the animal is removed from the trap the trip plate returns to horizontal position and the latch to substantially vertical position. To reset the trap, it suffices to lift the ring 18 of the striker 16, thus springing said striker up and onto its seat 23. The trap is baited by first opening the cover 30 and placing the bait in the usual way upon the tongue 13, then when the cover is closed the trap may be placed where desired and the strikers raised to seating position when the trap is set.

Should the trap be set at the time the tongues are being baited with the cover raised, the effort will obviously spring the trap, but as the strikers move substantially in the plane of their respective side walls, no harm can come to the person handling the trap.

What I claim as my invention is:

1. A rodent trap comprising a box-like structure having enclosing walls, one of said walls having an animal entrance opening, a trip plate having a trigger portion adapted to support bait pivotally mounted behind the animal opening, a spring loaded striker mounted adjacent the entrance wall to move, on being released, across the entrance opening, and a latch having a seat adjacent its upper end and a cam adjacent its lower end, said latch being suspended from the wall, said seat being adapted to support the striker in tensioned position and said cam being engaged by the trigger portion to swing the latch to release the striker from the seat.

2. A rodent trap comprising a box-like structure having enclosing walls, one of said walls having an animal entrance opening, a trip plate having a trigger portion adapted to support bait pivotally mounted behind the animal opening, a spring loaded striker mounted adjacent the entrance wall to move, on being released across the entrance opening, and a latch suspended from said wall, said latch having a seat for supporting the striker when tensioned, and a cam, said cam extending through an orifice in the trigger portion, said striker being so disposed when upon the seat to swing the latch and slip off the seat, the edge of the trigger portion orifice being adapted to engage one side of the cam to resist the swinging movement of the latch and to engage the cam to assist said latch to swing when the trigger portion is depressed.

WALTER LUCKTON.

REFERENCES CITED

The following references are of record in the file of this patent:

UNITED STATES PATENTS

| Number | Name | Date |
|---|---|---|
| 1,989,174 | Schwenk | Jan. 20, 1935 |
| 103,767 | Owen | May 31, 1870 |